United States Patent
Goswami et al.

(10) Patent No.: US 9,706,411 B2
(45) Date of Patent: Jul. 11, 2017

(54) SMALL CELL PLANNING TOOL

(71) Applicant: T-Mobile USA, Inc., Bellevue, WA (US)

(72) Inventors: Dibyendu Kumar Goswami, Issaquah, WA (US); Christopher Peter Chorney, Seattle, WA (US); Anthony J. Silveira, Downers Grove, IL (US)

(73) Assignee: T-Mobile USA, Inc., Bellevue, WA (US)

( * ) Notice: Subject to any disclaimer, the term of this patent is extended or adjusted under 35 U.S.C. 154(b) by 49 days.

(21) Appl. No.: 14/946,679

(22) Filed: Nov. 19, 2015

(65) Prior Publication Data

US 2017/0150365 A1 May 25, 2017

(51) Int. Cl.
H04W 40/00 (2009.01)
H04W 16/04 (2009.01)
H04W 16/18 (2009.01)

(52) U.S. Cl.
CPC ......... H04W 16/04 (2013.01); H04W 16/18 (2013.01)

(58) Field of Classification Search
USPC ..... 455/446, 501, 456.1, 424; 370/254, 328, 370/232
See application file for complete search history.

(56) References Cited

U.S. PATENT DOCUMENTS

| | | | |
|---|---|---|---|
| 6,738,350 B1 * | 5/2004 | Gao | H04B 7/18584 370/232 |
| 8,437,765 B2 | 5/2013 | Yang et al. | |
| 2010/0062790 A1 * | 3/2010 | Wigren | G01S 5/02 455/456.1 |
| 2011/0130137 A1 * | 6/2011 | Sanders | H01Q 1/246 455/424 |
| 2012/0315935 A1 * | 12/2012 | Wang Helmersson | H04W 16/18 455/501 |
| 2014/0031047 A1 * | 1/2014 | Jovanovic | H04W 16/04 455/446 |
| 2014/0269502 A1 * | 9/2014 | Forenza | H04B 17/12 370/328 |
| 2016/0050571 A1 * | 2/2016 | Zhuang | H04W 24/02 370/254 |
| 2016/0165462 A1 * | 6/2016 | Tan | H04W 24/02 370/254 |

* cited by examiner

*Primary Examiner* — David Q Nguyen
(74) *Attorney, Agent, or Firm* — Knobbe Martens Olson & Bear LLP

(57) ABSTRACT

Systems and methods are described for managing deployment of small cells in a wireless telecommunications network. A wireless telecommunications service provider obtains geolocated traffic data associated with the geographic coverage area of its network. The provider utilizes a planning tool to apply a clustering algorithm to the traffic data and identify areas of high traffic density as candidate locations. The planning tool may evaluate the candidate locations against the existing coverage and capacity of the wireless telecommunications network, and may identify solutions for the particular issues identified at the candidate location. The candidate locations, evaluation scores, and identified solutions may be output for display as a map or table, and the tool may automate various aspects of evaluating, recommending, and implementing identified solutions.

24 Claims, 9 Drawing Sheets

SMALL CELL PLANNING TOOL

BACKGROUND

Generally described, telecommunications devices and communication networks facilitate the collection and exchange of information. Utilizing a communication network and relevant communication protocols, a computing device can engage in voice and data communications with a wide variety of computing devices. In accordance with a telecommunications-based environment, telecommunications-based devices, such as mobile terminals, establish connections with various computing devices via a wireless communication network provided by a wireless communication service provider.

Wireless telecommunication networks are comprised of base stations or "cells" that transmit and receive radio signals within a particular geographic area. The geographic area for which a cell can provide wireless telecommunications services at an acceptable level of quality is known as the coverage of the cell, and the quantity of devices or the data throughput that the cell can support within its geographic area is known as the capacity of the cell. Cells may vary in coverage area according to the amount of power used for radio transmissions, the orientation and capabilities of antennas, the terrain, buildings, interfering signals, or other features that affect radio wave propagation.

To deliver service across a large geographic region, wireless communication service providers maintain networks of cells with overlapping coverages and capacities. Wireless communication service providers use predictive models and collected data to determine candidate locations for adding cells to their networks. However, the accuracy of these predictive models and data-gathering techniques is increasingly at issue as the coverage area of a cell decreases.

BRIEF DESCRIPTION OF THE DRAWINGS

The foregoing aspects and many of the attendant advantages will become more readily appreciated by reference to the following detailed description, when taken in conjunction with the accompanying drawings, wherein.

DETAILED DESCRIPTION

Figure 1:
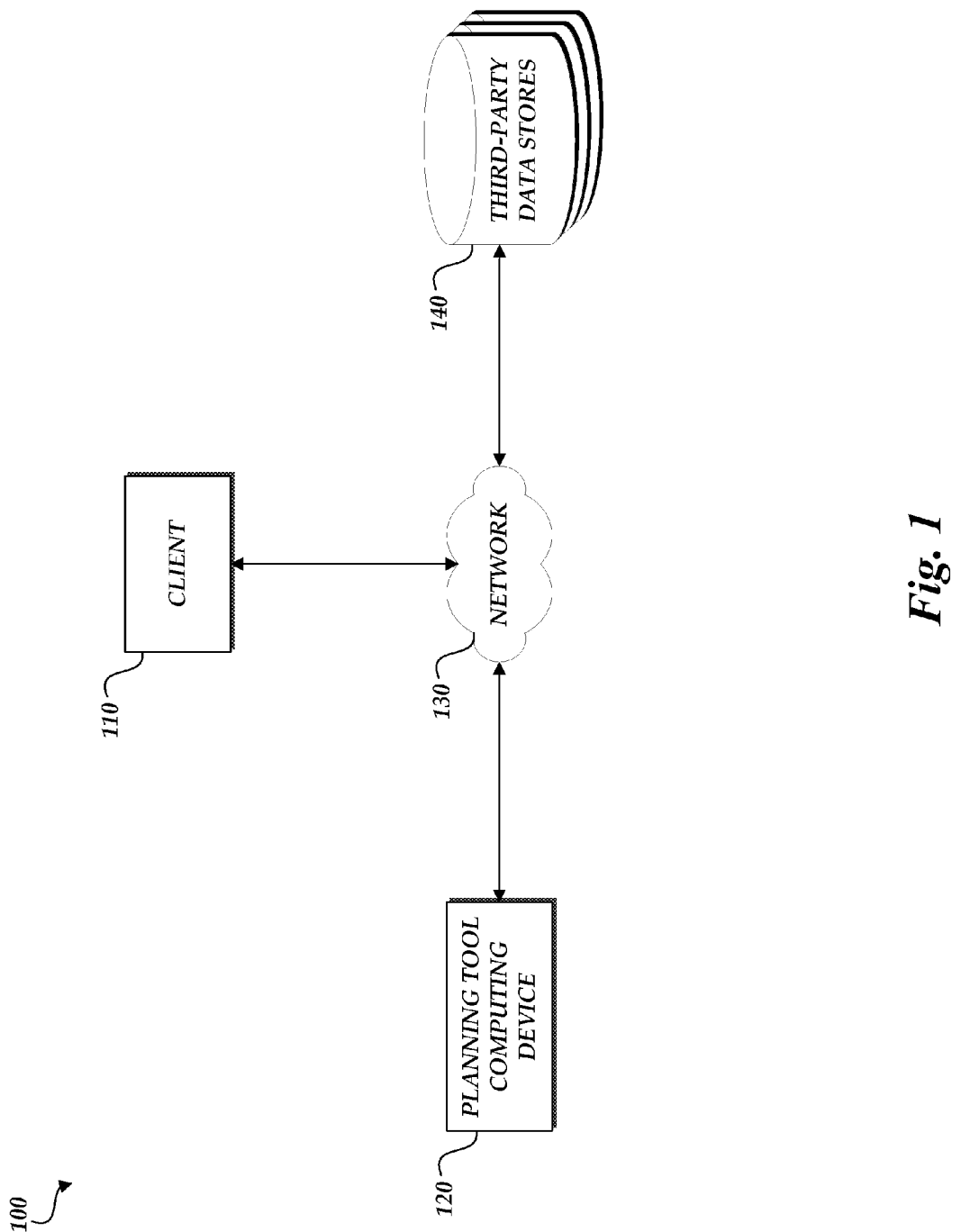
FIG. 1 is a schematic block diagram of an illustrative network topology including a client, a computing device, and multiple third-party data stores interconnected via a network.

Generally described, aspects of the present disclosure are directed to network planning by a wireless telecommunication service provider. More specifically, in an illustrative embodiment, aspects of the present disclosure relate to systems and methods for identifying candidate locations for small cells in a wireless telecommunications network. Additionally, aspects of the disclosure will be described with regard to transforming geolocated traffic data into candidate locations for small cell placement, into visual displays of candidate locations, and into various solution types for identified candidate locations.

In accordance with an illustrated embodiment, a wireless telecommunication service provider collects geolocated traffic data associated with a geographic coverage area of the provider's wireless telecommunication network. The traffic data is geolocated in that it contains information regarding traffic at particular places within the coverage area. For example, the geolocated traffic data may indicate that a particular user of a social media network posted to that network from a location within the coverage area. As a further example, the geolocated traffic data may include information that a mobile device downloaded a quantity of data while utilizing the wireless telecommunication network at a particular location. In some embodiments, the geolocated traffic data may be collected from the service provider's wireless telecommunication network. In other embodiments, the geolocated traffic data may be collected from, e.g., social media networks, customer care systems, or other sources. In some embodiments, as described below, the geolocated traffic data may include timestamps or other information regarding the traffic.

The wireless telecommunication service provider may further collect data regarding the wireless telecommunication network. Such data may include, for example, the locations of cell sites in the network, predicted and measured geographic coverage areas, capacities of cell sites (e.g., the quantities of subscribers or data that the cell site can support), subscriber and business locations, and the like.

To improve the performance of the wireless telecommunication network, the service provider may seek to identify locations within the network's geographic service area that require additional coverage or capacity. The service provider may further seek to evaluate these locations and to identify particular solutions that address a location's particular needs. In accordance with the present disclosure, the wireless telecommunication service provider may do so by providing geolocated traffic data and wireless network data to a small cell planning tool.

The small cell planning tool may analyze the geolocated traffic data it receives to identify particular locations within the wireless telecommunications network that are associated with a high traffic volume. Illustratively, the small cell planning tool may identify clusters of data associated with particular geographic regions within the coverage area of the network. For example, the planning tool may apply a clustering algorithm to the geolocated traffic data and identify a cluster of data points that fall within a specified distance of each other, or within a search ring of a particular radius. In some embodiments, the planning tool may filter the traffic data before applying a clustering algorithm, to limit the analyzed data points to, for example, those corresponding to a certain time of day. The small cell planning tool may identify these clusters and associated geographic regions as candidate locations for a small cell.

The small cell planning tool may further evaluate candidate locations by assessing the current performance of the wireless telecommunications network at the candidate locations. Illustratively, the planning tool may analyze the predicted coverage areas of existing cell sites to determine which sites provide coverage at the candidate location, and to determine whether they adequately cover the location. The planning tool may further analyze the current and projected capacity of cell sites serving the candidate location, forecasts and measurements of traffic load on these cell sites, and other data to assess whether the serving cells have sufficient capacity. The planning tool may calculate scores for the candidate location based on evaluations of these and other factors, as described below, and may calculate an aggregate score for the candidate location to assess its suitability as a candidate.

As an example, the planning tool may identify a candidate location that is close to the center of an existing cell with excess capacity. The tool may thus evaluate the candidate location and assign it a relatively low score, since the existing cell provides coverage and has sufficient capacity to handle the traffic volume. As a further example, the tool may identify a candidate location that is near the edge of the coverage area of two cell sites, both of which are overloaded in terms of capacity. The planning tool may therefore calculate a high aggregate score for the candidate location, indicating that a small cell or other solution placed at the candidate location would have a greater impact on the overall performance of the wireless telecommunication network.

Still further, in some embodiments, the small cell planning tool may identify a solution to address issues identified at the candidate location. Illustratively, the planning tool may compare the predicted coverage at the candidate location to actual measurements of coverage obtained at or near the candidate location. By comparing the prediction to the measurement at various points within the candidate location, the planning tool may determine that coverage at the candidate location is lower than predicted, and may accordingly determine that mobile terminals at the location are indoors, which is blocking receipt of the radio signals. The planning tool may thus identify a solution that increases indoor coverage, such as a distributed antenna system. In further embodiments, the planning tool may assess whether coverage at the candidate location exceeds a minimum threshold. For example, the planning tool may determine whether the candidate location has adequate coverage by comparing the predicted or measured coverage to a baseline. If the planning tool determines that coverage is adequate, it may identify a solution that increases capacity, such as a cell split. Alternatively, if the planning tool determines that coverage is inadequate, it may identify a solution that increases coverage, such as deploying a microcell to the candidate location.

Although described with reference to a wireless telecommunication service provider operating a wireless telecommunications network, elements of the present disclosure are not limited to the embodiment so illustrated. For example, a small cell planning tool may be used to analyze a third party's wireless telecommunication network, proposed changes to a network, a proposed network, or the rollout of an air interface standard, network feature, or other new technology. Further, although described herein with reference to cell coverage and cell capacity, other aspects of a wireless telecommunication network may be analyzed and evaluated. For example, a small cell planning tool may analyze cost, latency, or other factors when evaluating candidate locations. Still further, embodiments of the present disclosure include identifying and recommending a variety of solutions or combinations of solutions that address the identified deficiencies in the wireless network, such as deploying additional cell sites, increasing capacity of existing sites, deploying in-building solutions, offloading traffic to other networks (such as overlay networks, Wi-Fi networks, third-party wireless networks, and the like), or recommending a combination of one or more of these approaches.

The foregoing aspects and many of the attendant advantages will become more readily appreciated as the same become better understood by reference to the following description of illustrative embodiments, when taken in conjunction with the accompanying drawings depicting the illustrative embodiments.

With reference now to FIG. 1, an embodiment of an illustrative network topology 100 will be described. The network topology 100 may include a client computing device 110 ("client") that communicates with a planning tool computing device 120 via a network 130. Illustratively, the planning tool computing device 120 may access a number of third-party data stores 140 via the network 130.

The client computing device 110 may generally include any computing device that may be used to request or receive small cell candidate locations. While the term "client" is used in reference to the client computing device 110, the client computing device 110 should not be construed as limited to an end user computing device. Rather, the client computing device 110 may include end user computing devices, devices operated by a wireless telecommunication service provider, or devices owned or operated by third-party service providers. Examples of client computing devices 110 include, but are not limited to, laptops, personal computers, tablet computers, personal digital assistants (PDAs), hybrid PDA/mobile phones, mobile phones, electronic book readers, digital media players, wearable computing devices, integrated components for inclusion in computing devices, appliances, electronic devices for inclusion in vehicles or machinery, gaming devices, set top boxes, electronic devices for inclusion in televisions, and the like.

In the illustrated embodiment, the client 110 includes necessary hardware and software components for establishing communications over the network 130. For example, the client computing device 110 may be equipped with networking equipment and browser software applications that facilitate communications via the communication network 130. The network 130 can be a publicly accessible network of linked networks, possibly operated by various distinct parties, such as the Internet. In other embodiments, the network 108 may include a private network, personal area network ("PAN"), LAN, WAN, cable network, satellite network, wireless network, any other medium of computer data transfer, or some combination thereof.

Although not illustrated in FIG. 1, in some embodiments the client computing device 110 may communicate directly with the planning tool computing device 120 rather than communicating via the network 130. In further embodiments, the client computing device 110 and planning tool computing device 120 may be the same physical device, and the device may receive requests for small cell planning via keyboard, mouse, touchscreen, stylus, voice recognition, handwriting recognition, or other input mechanism.

The planning tool computing device 120 may illustratively be configured to execute a small cell planning tool, as discussed in more detail below with regard to FIG. 2. The planning tool computing device 120 may interact with one or more third-party data stores 140 via the communication network 130. Generally, a third-party data store 140 may correspond to a database, server, or any other device that can respond to requests for data from the planning tool computing device 120. Although depicted as external to the planning tool computing device 120, in some embodiments the third-party data stores 140 may be internal to the planning tool computing device 120. One skilled in the art will also appreciate that information provided in and/or by the third-party data stores may alternatively be provided by the same wireless telecommunications service provider that owns or operates the planning tool computing device 120.

In the illustrated embodiment, the client 110, planning tool computing device 120, and third-party data stores 140 may communicate via the network 130 using existing communications protocols such as the Hypertext Transfer Protocol (HTTP), specialized communications protocols, application programming interfaces (APIs), or any other communications protocol.

Figure 2:
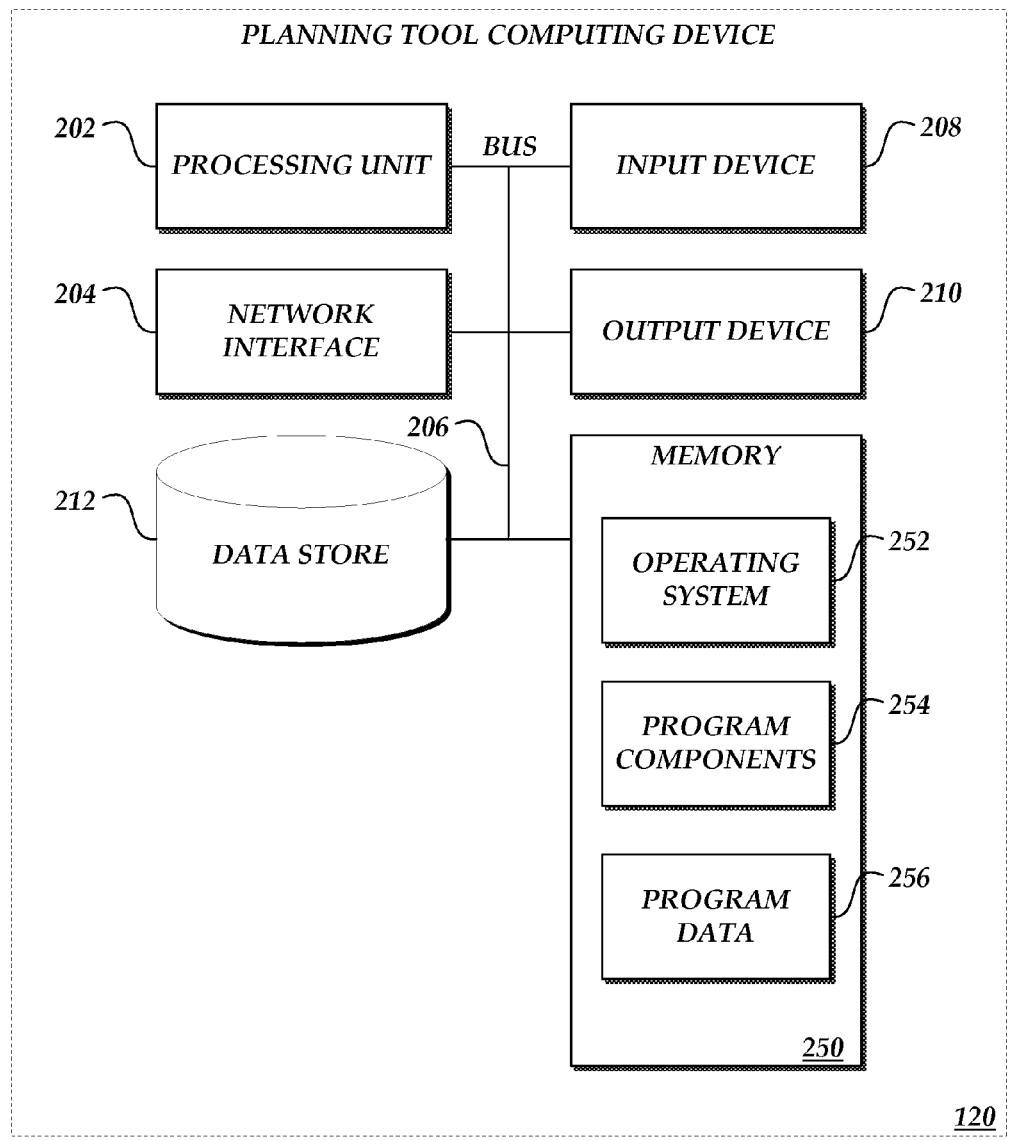
FIG. 2 is a simplified block diagram illustrating components of a computing device included within the network topology of FIG. 1.

FIG. 2 is an illustrative functional block diagram of a computing device 120 for small cell planning. The computing device 120 can be a server or other computing device, and can comprise a processing unit 202, a network interface 204, a data store 206, an optional input device 208, an optional output device 210, and a memory 250. The network interface 204 can provide connectivity to one or more networks or computing systems. The processing unit 202 can receive information and instructions from other computing systems or services via the network interface 204. The network interface 204 can also store data directly to memory 250. The processing unit 202 can communicate to and from memory 250 and output information to an optional output device 210 via the bus interface 206. The processing unit 202 can also accept input from the optional input device 208, such as a keyboard, mouse, digital pen, microphone, mass storage device, etc.

The memory 250 contains computer program instructions that the processing unit 202 executes in order to implement one or more embodiments. The memory 250 generally includes RAM, ROM, and/or other persistent, non-transitory computer readable media. The memory 250 can store an operating system 252 that provides computer program instructions for use by the processing unit 202 or other elements included in the computing device in the general administration and operation of the computing device 120. The memory 250 can further include computer program instructions and other information for implementing aspects of the present disclosure. For example, in one embodiment, the memory 250 includes program components 254 that implements aspects of the present disclosure. The program components 254 may illustratively correspond to all or some of the components depicted in FIG. 3, or the illustrative routines of FIGS. 6, 7, 8, and 9.

The elements included in the computing device 120 may be coupled by a bus 206. The bus 206 may be a data bus, communication bus, or other bus mechanism to enable the various components of the computing device 120 to exchange information. In some embodiments, the computing device 120 may include additional or fewer components than are shown in FIG. 2. For example, a computing device 120 may include more than one processing unit 202 and data store 212. In another example, the computing device 120 may not be coupled to an input device 208 or an output device 210. In still another example, the computing device 120 may include various interdependent or independent subcomponents implementing different aspects of the present disclosure. In some embodiments, two or more computing devices 120 may together form a computer system for executing features of the present disclosure.

Figure 3:
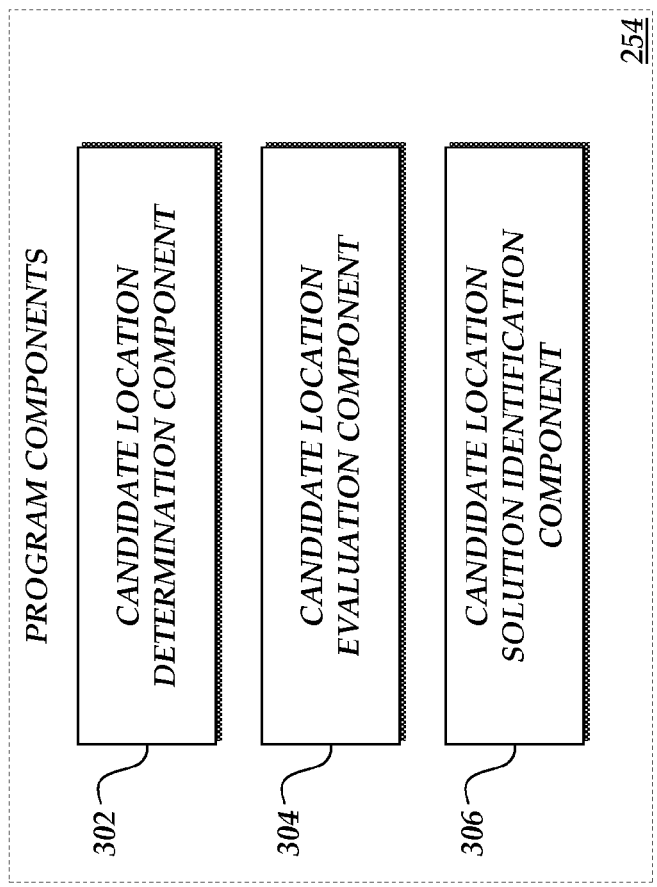
FIG. 3 is an illustrative block diagram depicting components of a small cell planning tool executed by the computing device of FIG. 2.

With reference now to FIG. 3, illustrative program components 254 of a small cell planning tool of the computing device 120 will be described. As one skilled in the art will appreciate, aspects of the present disclosure may be implemented with more or fewer components than the illustrated embodiment. For example, the candidate location evaluation component 304 may be divided into multiple components, each of which evaluates a candidate location against a different criterion or criteria.

In the illustrated embodiment, the program components 254 of the small cell planning tool computing device 120 include a candidate location determination component 302, a candidate location evaluation component 304, and a solution identification component 306. The candidate location determination component 302 may illustratively determine potential locations for small cell placement. In an embodiment, the component 302 may implement a candidate location determination routine, such as the exemplary routine 700 depicted in FIG. 7. The candidate location evaluation component 304 may illustratively evaluate one or more candidate locations for small cell placement. For example, the evaluation component 304 may assign scores, rankings, or ratings to a number of candidate locations to identify a candidate location having a greater or lesser need for a solution providing additional coverage or capacity at the location. The evaluation component 304 may illustratively implement a routine such as the candidate location evaluation routine 800 depicted in FIG. 8.

The solution identification component 306 may identify one or more possible solutions for providing additional coverage and/or capacity at a candidate location. As discussed in more detail below, identified solutions may include, for example, a small cell, a distributed antenna system, a picocell or microcell, splitting a nearby cell, and other solutions that increase the available coverage or capacity at the specified candidate location. One skilled in the art will appreciate that the solution identification component 306 may operate independently of the candidate location evaluation component 304, and that solutions may be identified for locations that have not been evaluated, or vice versa. In an embodiment, the solution identification component 306 may implement a solution identification routine such as the exemplary routine 900 depicted in FIG. 9.

Figure 4:
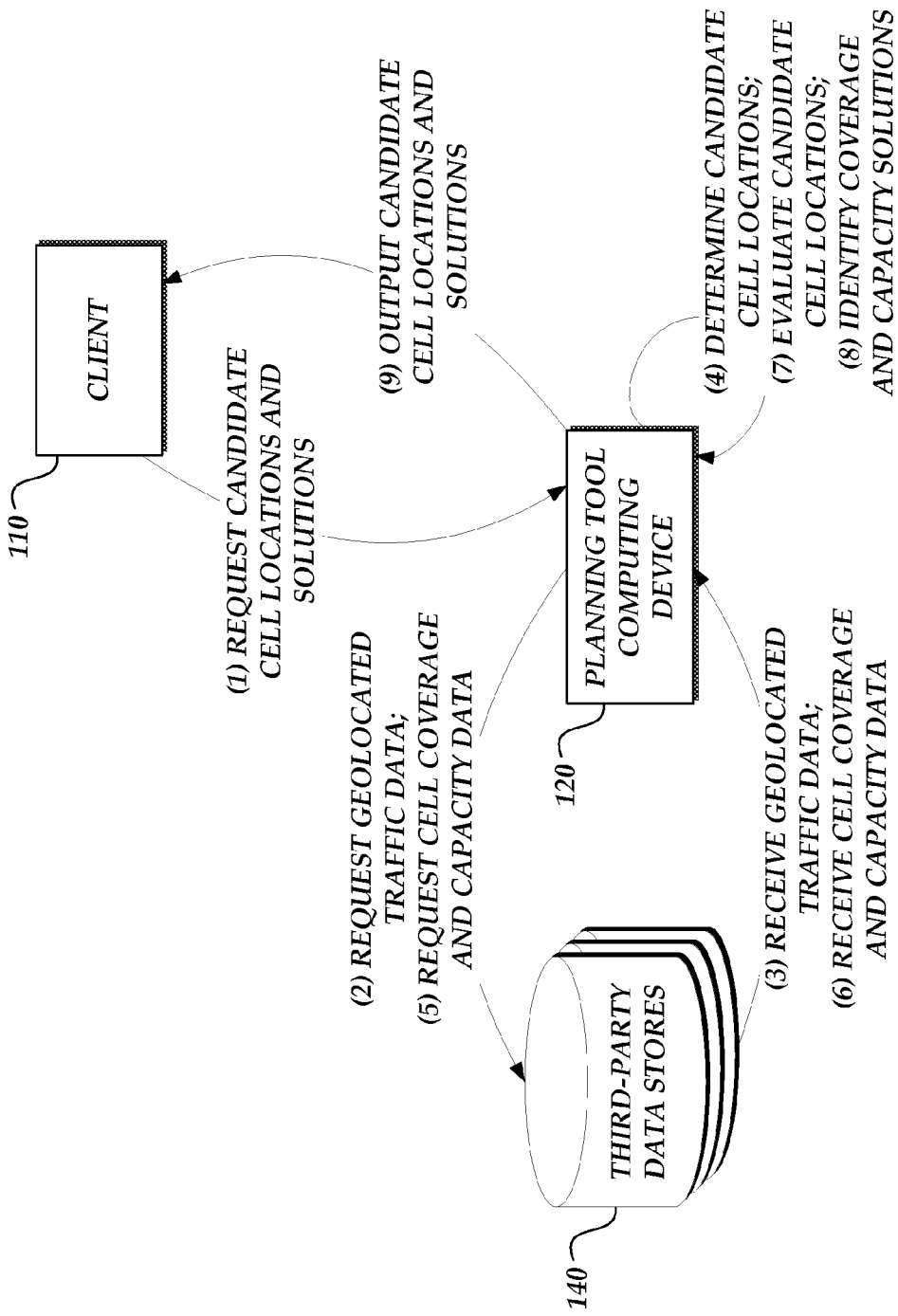
FIG. 4 is an illustrative block diagram of the network topology of FIG. 1 depicting transmission of a request to output candidate locations for small cells, retrieval of input data, identification and scoring of candidate locations, identification of coverage and capacity solutions, and output of candidate locations by a small cell planning tool.

With reference now to FIG. 4, a block diagram of the network topology of FIG. 1 illustrating an embodiment for the processing of small cell candidate location requests will be described. As illustrated in FIG. 4, at (1), a client computing device 110 requests candidate small cell locations and solutions from a small cell planning tool executing on a planning tool computing device 120. At (2), the planning tool executing on the computing device 120 requests geolocated traffic data from a third-party data store 140. In alternative embodiments (not depicted in FIG. 4), the request at (1) may include geolocated traffic data, or geolocated traffic data may be stored locally on the planning tool computing device 120. In such embodiments the request at (2) need not be carried out. Further, in some embodiments, the request at (1) may include a geographic area within which to identify small cell candidate locations. Alternatively, the request at (2) may specify a default geographic area, such as the geographic area associated with a network that provides wireless telecommunication services, or the geographic area may be specified as a function of the available geolocated traffic data.

At (3), the planning tool computing device 120 receives geolocated traffic data from a third-party data store. Geolocated traffic data may illustratively include a number of locations (e.g., latitude-longitude pairs, street addresses, or the like) with corresponding indications of traffic at the location, and may include multiple indications of traffic corresponding to the same location. Indications of traffic may include, for example, usage data from a wireless telecommunications network, activity on social media, "check-ins" at businesses or points of interest, user-generated usage reports, tickets from a customer care system, upload or download speeds, subscriber activations or cancellations, or any other data representing actual or potential usage of wireless telecommunications services at the specified location. Geolocated traffic data may further include date and time information (e.g., that a particular user posted to social media at a specified location, date, and time), user demographics, device characteristics, information about the location (e.g., altitude above sea level, proximity to a local business or point of interest, etc.), or any other information relevant to determining a small cell candidate location.

Thereafter, at (4), the small cell planning tool computing device 120 may determine a number of candidate locations for small cells. Illustratively, the small cell planning tool computing device 120 may apply filters to the geolocated traffic data, such as a time-based filter (e.g., data collected during the busiest hour of the day, or during a particular event), a geographic filter (e.g., downtown), a threshold-based filter (e.g., only those locations having five or more data points), or other such filtering criteria. Filters may be fixed ("5 pm to 6 pm" or "five or more data points") or relative (e.g., the 10% of locations that have the highest amount of traffic). The small cell planning tool computing device 120 may further apply, for example, clustering algorithms that aggregate traffic data for a particular region within the broader geographic area. In some embodiments, the planning tool computing device 120 may use a predefined cluster size, such as a search ring with a 200 m diameter, to aggregate the traffic data and identify clusters of high traffic density as candidate locations. However, embodiments of the present disclosure include clusters of any size or shape, such as triangles, squares, rhombuses, trapezoids, hexagons, other polygons, ovals, or irregular shapes (e.g., following a road or a terrain feature).

At (5), the small cell planning tool computing device 120 may request data regarding the existing cells of a wireless telecommunications network, and thereafter at (6) the planning tool computing device 120 receives cell data from a third-party data store 140. Such data may illustratively include cell site locations, capacities, coverage areas, and the like. One skilled in the art will appreciate that the interaction at (5) is independent of the interactions at (1), (2), (3), and (4), and may be performed before or in parallel with these interactions. In some embodiments, data regarding the existing cells may be stored locally at the planning tool computing device 120, in which case the interactions at (5) and (6) need not occur.

At (7), the small cell planning tool computing device 120 may optionally evaluate the candidate locations for small cells that were previously determined at (4). Illustratively, the computing device 120 may evaluate candidate locations based on a number of criteria, such as the geographical distance between a search ring and the nearest cell site, predicted or measured cell site coverage within the search ring, capacity of the cells that provide coverage within the search ring, and so forth. For example, a search ring for which the surrounding cells have little or no excess capacity may be evaluated as a high priority candidate for deploying a small cell, while a cluster of high-density traffic that is very close to an existing cell may be assessed as a lower priority. The small cell planning tool computing device 120 may evaluate candidate locations according to a number of criteria, may assign different values or scores for each of the criteria, and may aggregate criteria or results to produce an aggregate score for the cluster. For example, the computing device 120 may evaluate a particular cluster as having a score of 90 with regard to capacity, a score of 70 with regard to coverage, and a score of 60 with regard to proximity to nearby cells. The computing device 120 may thus calculate an aggregate score of 83 for the cluster based on these values. In various embodiments, the computing device 120 may apply weighting factors to the criteria when generating an aggregate score, or may assign scores as categories (e.g., "center," "intermediate," and "edge" for proximity to an existing cell), numerical values, rankings, grades, or use other measurement scales.

At (8), the planning tool computing device 120 may identify solutions to be proposed for the identified small cell candidate locations. As described in more detail below with regard to FIG. 9, the planning tool computing device 120 may illustratively classify a candidate location as requiring an indoor solution or an outdoor solution. For example, the planning tool computing device 120 may obtain metrics regarding the coverage within a search ring, such as signal-to-interference ratios (e.g., $E_c/I_o$ or RSRQ) or signal strength measurements (e.g., RSCP or RSRP), and may compare these metrics to a mathematical prediction of coverage based on antenna parameters and terrain data. The planning tool computing device 120 may identify a discrepancy between the predicted coverage and the measured coverage, and may attribute the discrepancy to the presence of an artificial structure (e.g., a building) within the search ring. Accordingly, the planning tool computing device 120 may identify an indoor solution, such as a distributed antenna system, to improve coverage within the building. In addition, the planning tool computing device 120 may illustratively compare obtained coverage metrics to a set of threshold values in order to assess whether additional coverage is required. The planning tool computing device 120 may therefore classify a search ring as suitable for a coverage solution or a capacity solution, and may identify solutions to improve coverage (e.g., adding a small cell within the search ring) or improve capacity (e.g., splitting a macrocell in or near the search ring).

At (9), the planning tool computing device 120 may output one or more small cell candidate locations to the client 110 or to another computing device (not shown). Illustratively, the output may include evaluations of the candidate locations, identified solutions or recommendations regarding the candidate solutions, geolocated traffic data, and other information. In some embodiments, the planning tool computing device 120 may transmit instructions to the client computing device 110 that cause the device 110 to display a map, information about one or more candidate locations, recommendations regarding candidate locations, and other information as described below.

Figure 5:
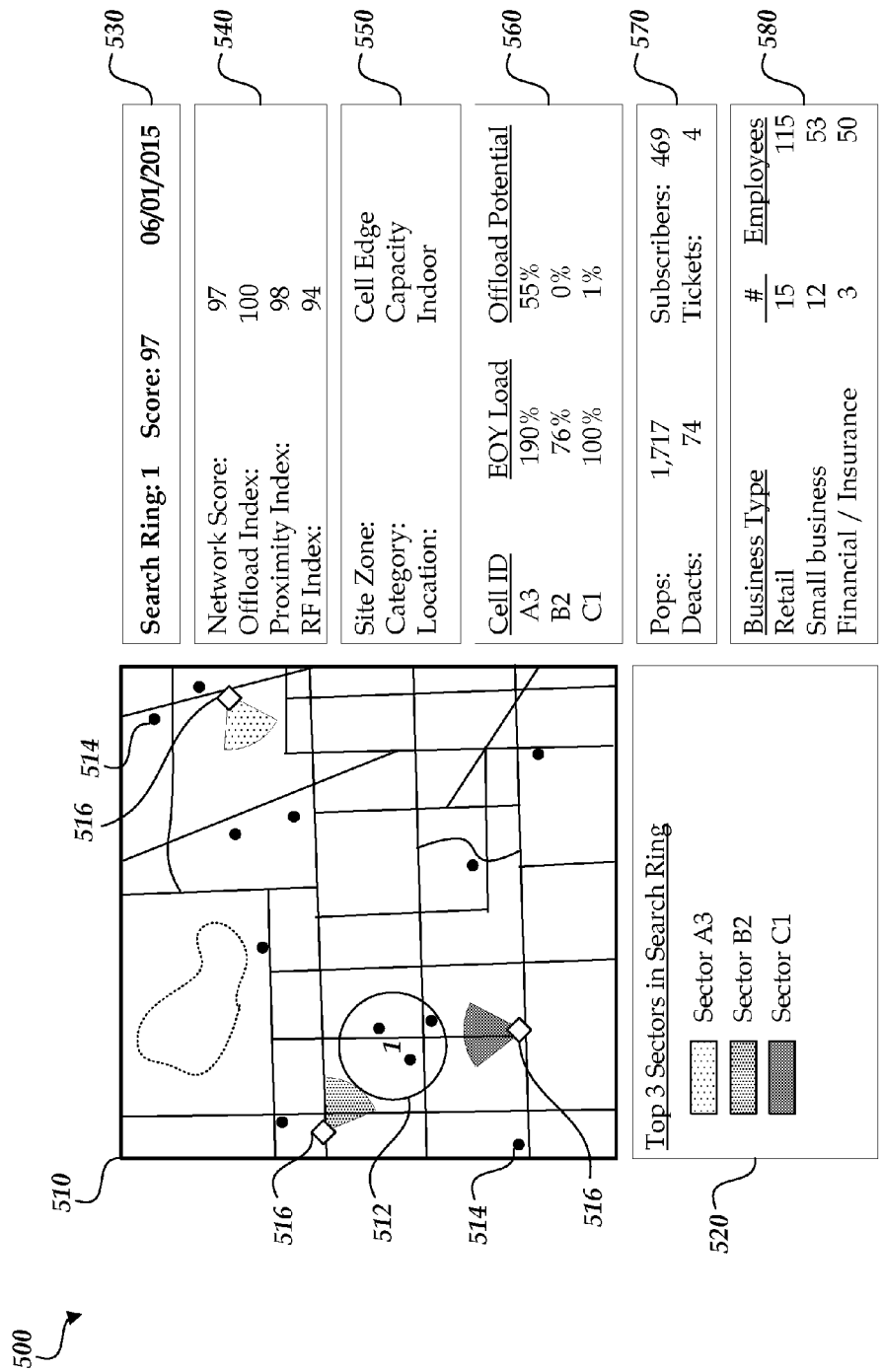
FIG. 5 is a pictorial diagram depicting an illustrative user interface that may be output by a small cell planning tool to provide information regarding a candidate location.

FIG. 5 is a pictorial diagram of an exemplary user interface 500 for displaying the output of the small cell planning tool. Embodiments of the present disclosure may provide and cause display of the output via any number of interfaces, including network pages displayed by a browser, mobile or desktop applications, touchscreen systems, kiosks, voice menus, and the like. As illustrated in FIG. 5, the output is displayed, in part, in the form of a geographical map 510, which may illustratively include geographical information such as streets and street names, terrain features (e.g., bodies of water, elevations, parks, etc.), buildings, business information, and the like, and which may illustratively provide controls for zooming, panning, etc. (not depicted in FIG. 5). The geographical map 510 may include one or more candidate locations 512, illustratively depicted in FIG. 5 as a search ring surrounding a region of high traffic density, as indicated by the number of traffic data points 514 within the search ring. Traffic data points 514 may correspond to individual or aggregate reports of traffic at a particular location. Search ring 512 is illustratively labeled as search ring number one, although aspects of the present disclosure may include any identifier.

The geographical map 510 may further display the locations of cell sites 516. Cell sites 516 may represent a subset of the sites in the wireless telecommunications network. Cells sites 516 may include, for example, sites that are proximate to the candidate location, sites that provide coverage at or near the candidate location, sites within the geographic region displayed in the map 510, or may be identified and displayed based on other criteria. The display of cell sites 516 may further include graphical representation of particular sectors that provide coverage, as illustrated by the shaded cones. Still further, the map 510 may display coverage areas associated with the cell sites 516 by overlaying colors, symbols, or other indications (not illustrated in FIG. 5).

The exemplary user interface 500 further includes a map legend 520 that displays information regarding the geographical map 510, such as identities of the cell sites 516, the particular sectors, information about the traffic data points 514, or other data.

The exemplary user interface 500 yet further includes tables 530, 540, 550, 560, 570, and 580 which illustratively display information about the search ring 512. One skilled in the art will appreciate that these tables may be combined or separated to produce various output displays within the scope of the present disclosure, or that the information may be displayed in various formats. For example, the geographic map 510 may display multiple search rings 512, and selecting one of the search rings 512 may interactively cause information in tables 530, 540, 550, 560, 570, and 580 to be displayed in a window associated with the selected search ring.

Header table 530 displays a label, an aggregate score for the identified search ring, and the date on which the search ring 512 was identified. Score table 540 displays various scores that were calculated by the small cell planning tool computing device 120, such as a score based on the proximity of the search ring 512 to the nearest cell site 516. Solution table 550 displays information regarding a site zone (e.g., center, intermediate, or edge), site type (e.g., capacity or coverage), and solution type (e.g., indoor or outdoor) that has been identified for the search ring 512. In some embodiments, solution table 550 may display a recommended solution corresponding to the site type and the solution type. For example, solution table 550 may display the recommended solution of a distributed antenna system for a search ring 512 identified as requiring additional indoor coverage. In some embodiments, solution table 550 may display multiple solutions. For example, solution table 550 may display a tabular list of solutions, and may recommend one or more solution types (e.g., an indoor solution and an outdoor solution).

Cell table 560 displays information regarding the cell sites 516. Such information may include, for example, a traffic forecast for the cell expressed as a percentage of its capacity, and an evaluation of the percentage of that traffic which may be offloaded if a small cell or other solution is implemented in the search ring 512.

Customer table 570 displays information regarding current and potential customers of a wireless telecommunications network who are located within the search ring 512. Similarly, business table 580 displays information regarding businesses located within the search ring 512. The information displayed in these tables may include, for example, demographic data, information from customer care systems or subscriber databases, and the like.

Figure 6:
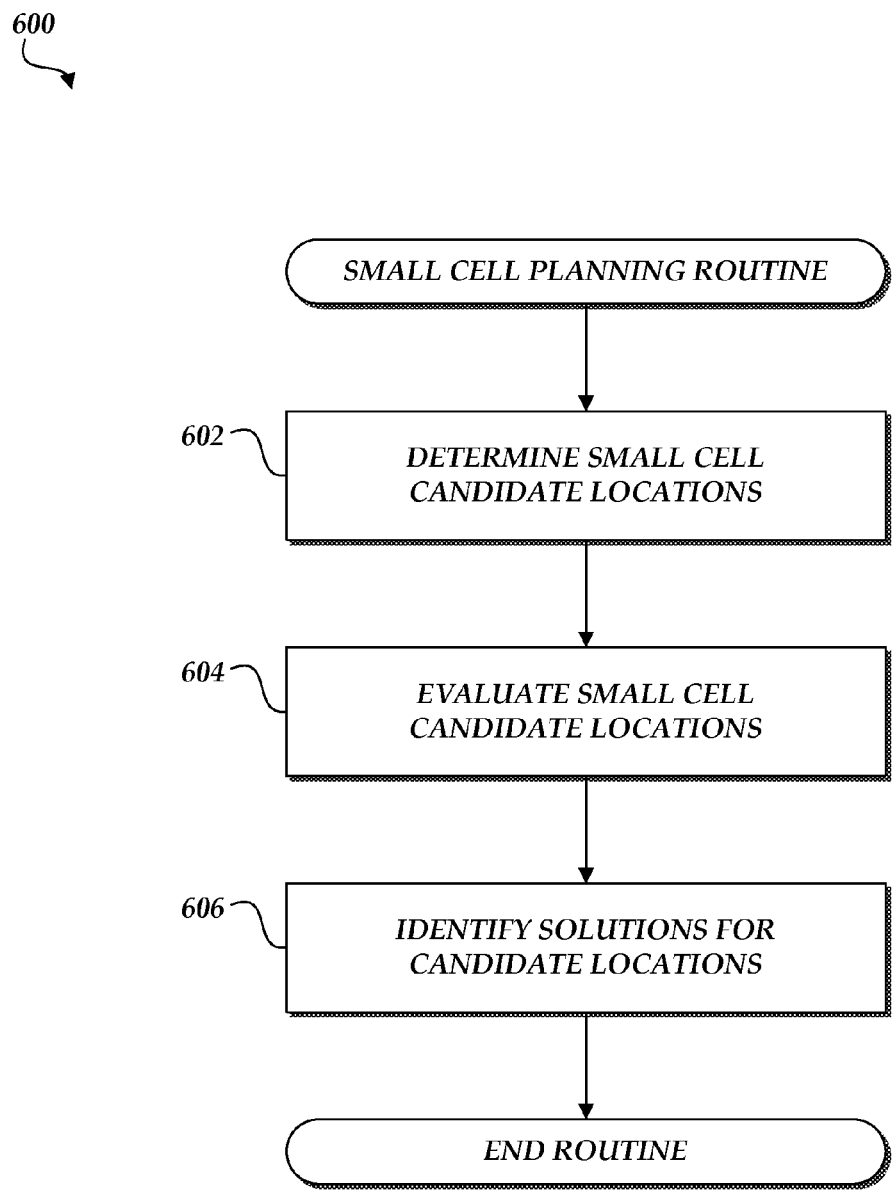
FIG. 6 is a flowchart illustrative of a small cell planning routine implemented by a small cell planning tool.

With reference now to FIG. 6, a flowchart illustrative of a small cell planning routine 600 will be described. The routine may be carried out, for example, by the planning tool computing device 120 of FIG. 2. In FIG. 6, the routine 600 begins at block 602, where the planning tool computing device 120 determines one or more candidate locations for small cells. Illustratively, the computing device 120 may implement the routine depicted in FIG. 7 to determine small cell candidate locations. At block 604, the computing device 120 evaluates the candidate locations identified at block 604, illustratively by implementing the routine depicted in FIG. 8. At block 606, the planning tool computing device 120 identifies solutions that address, for example, coverage and capacity issues for the small cell candidate locations identified at block 602. Illustratively, in some embodiments, block 606 may implement the routine illustrated in FIG. 9. One skilled in the art will appreciate the blocks of the small cell planning routine 600 may be carried out in other orders and combinations not depicted in FIG. 6. For example, blocks 604 and 606 may be carried out separately from block 602 to evaluate or identify solutions for previously determined candidate locations.

Figure 7:
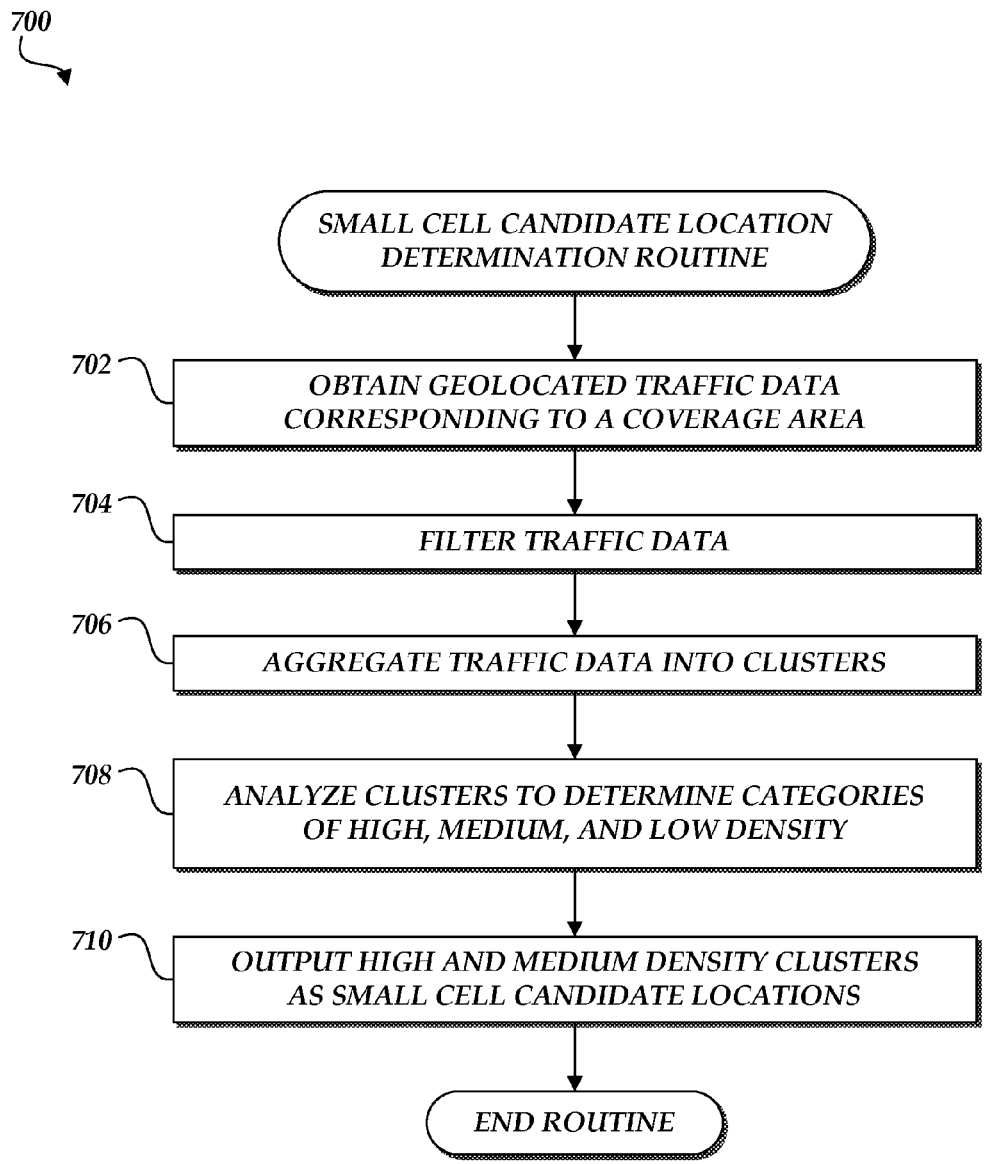
FIG. 7 is a flowchart illustrative of a candidate location determination routine implemented by a small cell planning tool.

FIG. 7 depicts an illustrative flowchart of a small cell candidate location determination routine 700. The routine may be carried out, for example, by the planning tool computing device 120 of FIG. 2, and particularly using the candidate location determination component 302. The routine starts at block 702, where geolocated traffic data may be obtained that corresponds to the coverage area of a wireless telecommunications network. Although described above in terms of wireless network usage data, social media activity, and the like, embodiments of the present disclosure may obtain geolocated traffic data from any source that provides information about activity at specific locations within the coverage area.

At block 704, the geolocated traffic data obtained at block 702 may optionally be filtered to identify data of particular interest. Illustratively, traffic data may be filtered to include only data from a particular time of day, from locations with the most traffic, from particular data sources or categories, may be filtered based on characteristics of the data (e.g., breakpoints or thresholds within the data set), regression analyses, or similar techniques.

At block 706, the geolocated traffic data or the filtered geolocated traffic data may be aggregated into clusters. Traffic data may be aggregated into clusters using a number of algorithms. For example, traffic data may be aggregated using a cluster density algorithm that identifies clusters of data points at a particular place. Clustering algorithms may also consider factors such as time, traffic type (e.g., voice or data), data source, and other criteria. As described above, clusters may illustratively be 200 m search rings, or may be any other shape.

Thereafter, at block 708, the clusters may be analyzed to determine the density of each cluster. Illustratively, clusters may be automatically categorized by the small cell planning tool computing device 120 as high, medium, or low density according to the number of data points they contain. For example, clusters may be categorized as high density if they are among the top ten percent of clusters, the top ten clusters, or if the number of data points they contain exceeds a threshold. In some embodiments, a clustering algorithm may be further applied to identify "clusters of clusters," and classify sets of clusters in terms of their density. One skilled in the art will appreciate that cluster density may be expressed in terms of categories, numerical scores, grades, or other measurement scales. Further, in some embodiments, clusters may be categorized by applying criteria to the geolocated traffic data points they contain. For example, a weighting factor may be applied to geolocated traffic data from a particular source, such as traffic from users of a fast-growing social network, to express that traffic density in the cluster is likely to increase more rapidly. In still further embodiments, clusters may be analyzed and rank-ordered to identify a highest-density cluster, a second-highest-density cluster, and so forth.

At block 710, certain clusters may be recommended as candidate locations for small cells based on cluster density. For example, only high-density clusters may be recommended, or both high- and medium-density clusters may be recommended. Small cell candidate locations may be provided to a client device, such as the client computing device 100, or may be provided to a separate routine for further processing, such as the routines illustratively depicted in FIGS. 8 and 9. In some embodiments, a choropleth map (a "heat map") may be automatically generated and provided that displays small cell candidate locations as shaded regions on a geographic map of the wireless network coverage area. The map may further display geolocated traffic data, existing cell sites, terrain features, or other related information. Illustratively, candidate locations for small cells may be provided to network planning engineers of a wireless network service provider, to a third-party wireless service provider, or to other parties who may utilize the candidate locations for various purposes. For example, candidate locations for small cells may be provided to radio frequency engineers, who may use the recommended locations to identify areas where radio frequency optimization will have a greater impact on the performance of surrounding cells. As a further example, network planning engineers may use small cell candidate locations to identify potential infill locations for future macro cells.

One skilled in the art will understand that the term "candidate location" may illustratively refer to an area or a region within the geographic coverage area of a wireless telecommunications network, such as a search ring with a diameter of 200 meters, as opposed to any particular coordinate. Although the placement of a small cell or other solution may occur at a specific coordinate within the search ring, it is understood that the search ring includes a number of coordinates, and that a candidate location may be determined without regard to whether a small cell may be placed at any particular coordinate. For example, the planning tool computing device 120 may identify a search ring whose geographic center corresponds to a body of water, street, or other terrain feature or point of interest that precludes adding a small cell at that particular coordinate. The wireless network service provider may thus identify a different coordinate in or near the search ring where deploying a small cell or other solution will improve service for the identified traffic cluster. A number of factors known to those skilled in the art may influence the determination of a coordinate, including radio interference, available real estate, terrain features, the distribution of data points within the search ring, or other factors.

Figure 8:
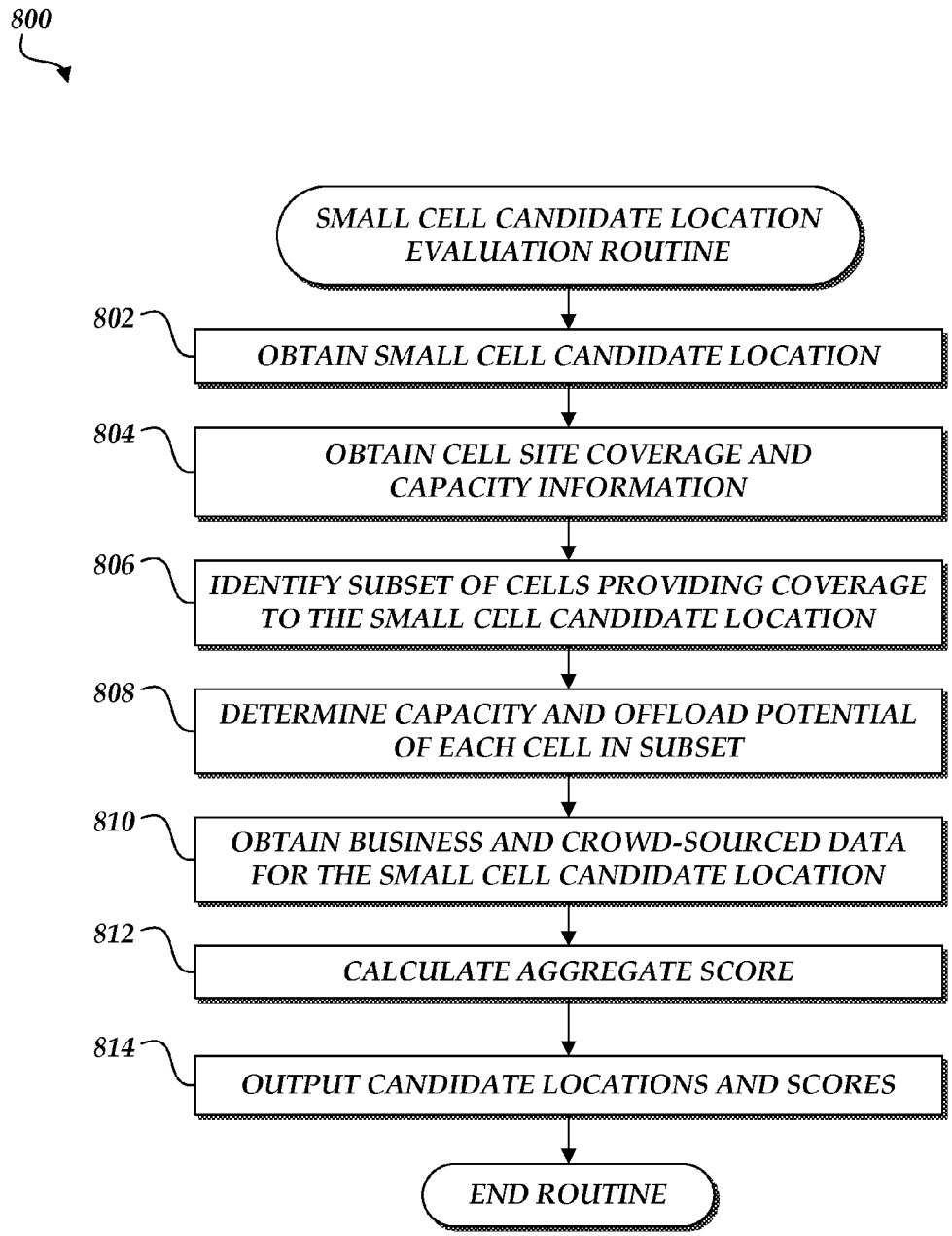
FIG. 8 is a flowchart illustrative of a candidate location evaluation routine implemented by a small cell planning tool.

With reference now to FIG. 8, a flowchart illustrative of a small cell candidate location evaluation routine 800 will be described. The routine may be carried out, for example, by the planning tool computing device 120 of FIG. 2, and particularly using the candidate location evaluation component 304. The routine begins at block 802, where a small cell candidate location may be obtained. A candidate location may be obtained, for example, from a routine that determines small cell candidate locations, such as the illustrative routine 700 depicted in FIG. 7. A candidate location may be specified as a particular location (e.g., a latitude-longitude pair, a street address, etc.) and a search radius, a collection of points defining a geographic area, or by other means. While block 802 is depicted as obtaining a single candidate location, the illustrative routine 800 may be invoked iteratively for any number of candidate locations.

At block 804, coverage and capacity information may be obtained for cell sites of a wireless telecommunications network. Illustratively, information may be obtained such as the location of a cell site, a geographic region in which the cell is predicted to provide coverage, a capacity of the cell, and so forth. Information may be obtained, for example, for all of the cell sites of a wireless telecommunications network, or for sites located in a particular region of the network, located within a specified distance of the candidate location, or according to other criteria. Thereafter, at block 806, a subset of cells providing coverage to the candidate location may be identified. The subset may illustratively be identified by determining whether the candidate location and the coverage area of each cell site overlap, whether they overlap by a specified percentage or threshold, whether the location of each cell site is within a specified distance of the candidate location, and so forth. In some embodiments, a coverage score may be automatically determined for the candidate location based on the coverage areas of the identified cell sites. For example, the small cell planning tool computing device 120 may determine, based on the coverage areas of the identified cell sites, that 70% of the candidate search ring has coverage from one or more of the cells. The small cell planning tool computing device 120 may thus determine a coverage score of 70 for the candidate location, indicating a relative amount of additional coverage required to provide wireless network service throughout the candidate location.

At block 808, the capacity and offload potential of each cell in the subset may be determined. Illustratively, the small cell planning tool computing device 120 may automatically determine the capacity and offload potential of each cell based on the capacity information obtained at block 804. A cell's capacity may be determined, for example, based on the physical configuration of the cell (e.g., the number of radios, available bandwidth, etc.) In some embodiments, as described above, a cell's capacity may be determined relative to an actual or projected traffic load for the cell. For example, the small cell planning tool computing device 120 may obtain traffic data including call volumes and data throughputs for a cell over a specified time period, such as a calendar year, and may analyze the call minutes and data usage to determine whether the cell's capacity is fully utilized, under-utilized, or that a percentage of calls and data are being turned away from the cell due to lack of capacity. Such analyses may consider traffic data for thousands of calls and data connections per hour, and may assess on an hour-by-hour or minute-by-minute basis whether the cell's capacity has been exceeded.

In some embodiments, an aggregate capacity score may be automatically determined for the candidate location based on the relative capacities of each cell. For example, the small cell planning tool computing device 120 may determine that five cells in or near the candidate location are operating at 90% of capacity, 120% of capacity, 110% of capacity, 100% of capacity, and 95% of capacity respectively. The small cell planning tool computing device 120 may thus determine an aggregate capacity score of 103% for the candidate location. In further embodiments, the small cell planning tool computing device 120 may analyze raw measurements of capacity, such as the number of additional calls that a cell can support during a particular time period, to determine a capacity score for each cell and an aggregate capacity score for the candidate location. The small cell planning tool computing device 120 may further apply weighting factors based on, for example, the proximity of each cell to the candidate location. One skilled in the art will appreciate that these determinations may analyze data for thousands or millions of calls over a specified time period, and may further involve predictions of future call volumes that extrapolate from measured traffic data.

A cell's offload potential may illustratively be determined based on the percentage of the cell's traffic that could be offloaded to a small cell deployed in the candidate location. For example, a cell's offload potential may be automatically determined by determining a capacity score for the cell, determining a percentage of overlap between the cell's coverage area and the candidate location, and multiplying. In some embodiments, an aggregate offload potential may be determined for the candidate location by aggregating the capacity scores for each cell, or by aggregating capacity scores for cells that exceed a specified capacity threshold. For example, the small cell planning tool computing device 120 may determine that cell A has a capacity score of 190%, cell B has a capacity score of 100%, and cell C has a capacity score of 76%. The small cell planning tool computing device 120 may further determine that 29% of cell A's coverage area overlaps the search ring, 1% of cell B's coverage area overlaps the search ring, and 8% of cell C's coverage area overlaps the search ring. The small cell planning tool computing device 120 may thus determine an offload potential of 55% for cell A, 1% for cell B, and 6% for cell C, and may determine an aggregate offload potential of 62% for the candidate location.

At block 810, business data or crowdsourced data for the candidate location may optionally be obtained. Illustratively, the business data and crowdsourced data described above with regard to FIG. 5 may be obtained for the candidate location. Business data may be obtained from, for example, subscriber information, public records, or other data gathering methods. Business data may include, for example, the number of businesses within the candidate location, the type of each business (e.g., retail, real estate, etc.), the number of employees at each business, whether the business is currently a customer of the wireless network service provider, and so forth. Crowdsourced data may include geotagged social media content, tickets or reports from customer care systems, information from subscriber databases, and the like. In some embodiments, crowdsourced data may be associated with particular social networks or events, and may constitute thousands of data points from individual users or subscribers. Business and crowdsourced data may further contain time-related information such as business hours, event dates and times, timestamps associated with geotagged content, and may be analyzed to determine temporal clusters. One skilled in the art will appreciate that block 810 does not depend on block 808 and may be carried out before or in parallel with block 808.

At block 812, the small cell planning tool computing device 120 may automatically determine an aggregate score for the candidate location. Illustratively, the aggregate score may be indicative of the strength of a recommendation to add a small cell or other solution at the candidate location. For example, an aggregate score of 99, on a zero to 100 scale, may indicate a strong recommendation for adopting the identified solution. The aggregate score may be a single score, multiple scores representing different factors, or an aggregation of scores that weights and combines various factors. In some embodiments, an aggregate score may be determined based on the scores determined at each of blocks 806, 808, and 810. One skilled in the art will appreciate that these scores may be calculated, aggregated, and weighted based on various factors and criteria in order to determine an aggregate score for the candidate location.

Still further, an aggregate score may include sub-scores or other factors that are not illustrated in FIG. 8. For example, a proximity score may be calculated by determining the nearest cell to the candidate location and determining the distance from the candidate location to the cell, or by determining whether the candidate location is closer to the center, the middle, or the edge of the nearest cell. Illustratively, distances may be calculated as a distance from the cell site location to the center of a search ring, as a distance from the cell site to the nearest edge of the search ring, or by any other method. Although expressed herein as percentages and numeric values, aspects of the present disclosure include scores using any scale of measurement that permits evaluation of candidate locations.

At block 814, the candidate location and associated scores may be output. Illustratively, the candidate location and associated scores may be output via a user interface, such as the exemplary user interface 500 depicted in FIG. 5. In some embodiments, the small cell candidate location evaluation routine 800 may be carried out iteratively for a number of candidate locations, and the output of block 814 may rank the candidate location relative to previously evaluated candidate locations. For example, a candidate location with an aggregate score of 100 may be ranked as the top candidate location, while a second candidate location with an aggregate score of 97 may be ranked as the second-best candidate and a third with an aggregate score of 89 may be ranked as the third-best candidate. In further embodiments, the output of block 814 may be used to automatically compare candidate locations and identify a subset of the evaluated candidate locations for further consideration by, e.g., a solution identification routine, such as the illustrative routine 900 depicted in FIG. 9. Illustratively, a subset may be selected based on a number (e.g., the top three candidate locations), a percentage (e.g., the top 10% of candidate locations), a threshold (e.g., candidate locations whose aggregate score exceeds 90), individual scores, user-defined criteria, or other measures. Still further, in some embodiments, evaluated candidate locations may be output in a manner that allows user interaction and user selection of candidates for further consideration. User interaction may by carried out, for example, by displaying a geographic map that includes candidate locations, and that allows a user to select and highlight one or more of the candidates.

Figure 9:
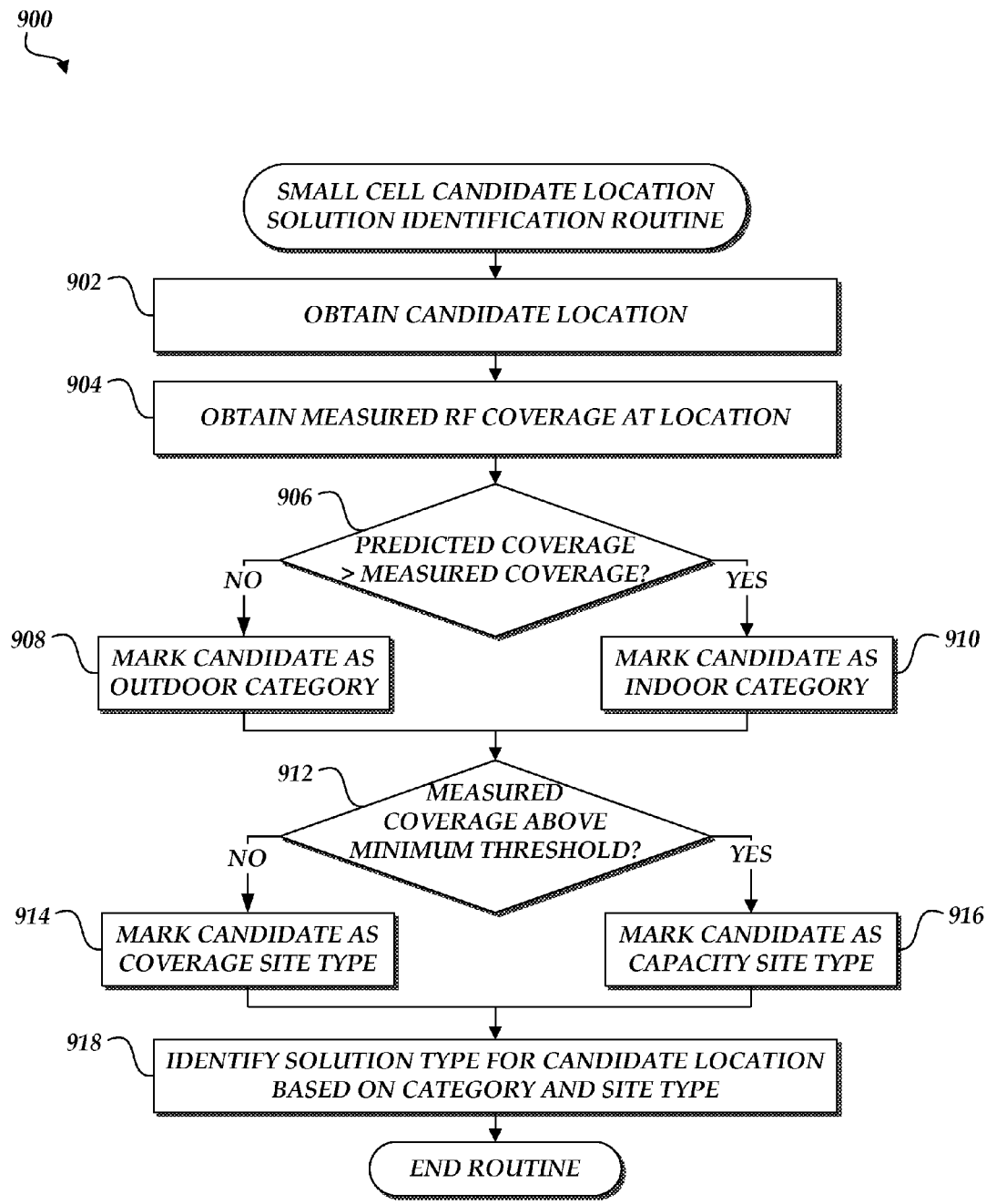
FIG. 9 is a flowchart illustrative of a solution identification routine implemented by a small cell planning tool.

FIG. 9 depicts an illustrative flowchart of a small cell solution identification routine 900. The routine may be carried out, for example, by the planning tool computing device 120 of FIG. 2, and particularly using the candidate location solution component 306. The routine starts at block 902, by obtaining a candidate location for a small cell. As with routine 800, the solution identification routine 900 may, in some embodiments, obtain a candidate location from a candidate location routine, such as the illustrative routine depicted in FIG. 7. In other embodiments, the routine 900 may obtain a candidate location as an output of location evaluation routine 800, directly from a client computing device 110, through user input, or from any other source. Similarly, although block 902 depicts obtaining a single candidate location, one skilled in the art will understand that routine 900 may be carried out repeatedly to identify solutions for any desired number of candidate locations.

Thereafter, at block 904, measurements of coverage at the candidate location may be obtained. Illustratively, a set of coverage measurements may be obtained for the geographic area associated with the wireless telecommunication network, and coverage measurements relevant to the candidate location may be determined by identifying a subset of measurements that were taken in or near the candidate location, or by identifying measurements associated with a subset of cells identified as providing coverage at the candidate location, such as the subset identified at block 806 of illustrative location evaluation routine 800. Coverage measurements may include, for example, measurements of received signal strength or signal-to-interference ratios taken at particular coordinates within the search ring. Illustratively, metrics measuring coverage may be taken and reported by the mobile terminals of subscribers to a wireless telecommunications network, or may be collected by the network operator. At decision block 906, the coverage measurements may be compared to predictions of coverage for the candidate location. For example, the small cell planning tool computing device 120 may utilize one or more mathematical models or simulations to predict the coverage of cells in a network, and may identify the subset of these predictions corresponding to the region of the candidate location. If the predicted coverage exceeds the measured coverage, then at block 910 the solution category for the candidate location is determined to be an indoor solution. If the predicted coverage does not exceed the measured coverage, then at block 908 the solution category is marked as an outdoor solution.

In some embodiments, the small cell planning tool computing device 120, determines, at decision block 906, whether the predicted coverage exceeds the measured coverage by a threshold or percentage (e.g., whether the predicted coverage is 10% higher than the measured coverage), and compares actual measurements of coverage to predicted values on a per-measurement basis. In further embodiments, the measurements obtained at block 904 may be estimated based on customer care tickets, dropped calls, measurements of data throughput on subscriber devices, or other data.

At decision block 912, measured coverage may be compared to a threshold value. Illustratively, received signal strength measurements at the candidate location may be assessed. For example, block 912 may assess whether 10% or more of the RSCP measurements taken within the candidate search ring are less than −101 dBm. As a further example, signal-to-interference measurements taken at the candidate location (e.g., $E_c/I_o$) may be compared to a threshold. If the measured coverage exceeds the threshold criteria, then at block 916 the candidate location may be identified as requiring a capacity solution. Alternatively, if the measured coverage is insufficient, then at block 914 the candidate location may be identified as requiring a coverage solution. One skilled in the art will appreciate that decision block 912 does not depend on decision block 906, and that the order in which the two block are carried out may be reversed. In some embodiments, the small cell solution identification routine 900 may perform only one of decision blocks 906 and 912.

At block 918, a solution type for the candidate location may be identified. Illustratively, the small cell planning tool computing device 120 may automatically identify a solution type for the candidate location based on the outcomes of decision blocks 906 and 912. The solution type may correspond to, for example, a small cell, a distributed antenna system (DAS), picocell, microcell, cell split, or other solution for providing increased coverage and/or capacity at the candidate location. In some embodiments, the small cell planning tool computing device 120 may implement block 918 as a lookup table that takes the solution category and site type as inputs. The solution type may be determined based on the identified solution category and site type. For example, for a candidate location where measured coverage is both lower than predicted and is below a minimum threshold, a solution that provides additional indoor coverage (such as an in-building DAS) may be identified. As a further example, for a candidate location where the measured coverage meets or exceeds predictions and is above a minimum threshold, a solution may be identified that provides additional capacity, such as splitting one of the nearby cells to make more capacity available. Various other combinations and solutions may be identified within the scope of the present disclosure.

At block 920, the identified solution may be output as a recommended solution type. Illustratively, the output of the solution identification routine 900, the candidate location evaluation routine 800, and the candidate location identification routine 700 may be combined to generate the display depicted in FIG. 5.

In some embodiments, the output at block 920 may include additional information or instructions. For example, the output of the solution identification routine 900 may include a cost estimate for the identified solution, a cost-benefit analysis, recommended parameter changes at surrounding cell sites, a placement of the solution within the candidate location (e.g., within a particular building, opposite the nearest cell, etc.), or other information related to the identified solution.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method comprising:
   obtaining geolocated traffic data corresponding to a geographic coverage area associated with a cellular network;
   identifying a cluster within the geolocated traffic data, the cluster corresponding to a region of high traffic density within the geographic coverage area;
   identifying a subset of cells providing coverage within the region, wherein identifying the subset is based at least in part on a predicted coverage forecast for each cell within a set of cells associated with the geographic coverage area;
   calculating an aggregate score for the cluster, the aggregate score based at least in part on the predicted coverage forecast of each cell within the subset;
   obtaining measured coverage data for the region;
   determining, based at least in part on the measured coverage data, a solution type for the cluster; and
   outputting the cluster, the aggregate score, and the solution type.

2. The method as recited in claim 1, wherein outputting the cluster comprises transmitting instructions to cause a client computing device to display a map of the region corresponding to the cluster.

3. The method as recited in claim 2, wherein the map of the region includes at least a portion of the subset of cells providing coverage within the region.

4. The method as recited in claim 2, wherein the map of the region includes at least a portion of the geolocated traffic data.

5. The method as recited in claim 1 further comprising calculating a proximity score for the cluster, wherein the aggregate score is further based at least in part on the proximity score, and wherein calculating the proximity score comprises:
   determining, for each cell within the subset of cells, a respective distance between a location of the cell and the region;
   identifying a nearest cell within the subset of cells, wherein the nearest cell is the cell having the smallest distance; and
   calculating a score based at least in part on the distance between the nearest cell and the region.

6. The method as recited in claim 5, wherein the proximity score corresponds to one of a cell center, an intermediate area, or a cell edge.

7. The method as recited in claim 1 further comprising calculating an offload potential for the cluster, wherein the aggregate score is further based at least in part on the offload potential, and wherein calculating the offload potential comprises:
obtaining a respective capacity forecast for each cell within the subset of cells;
determining, for each cell within the subset of cells, a respective offload potential, the offload potential for the cell comprising a percentage of cell site traffic that is offloadable in the region; and
aggregating the respective offload potentials of each cell within the subset of cells to determine the offload potential for the cluster.

8. The method as recited in claim 1, wherein determining a solution type for the cluster comprises:
calculating, for each cell within the subset of cells, a difference between the predicted coverage forecast for the cell and a respective portion of the measured coverage data corresponding to the cell;
aggregating the differences for each cell to produce a difference between predicted and measured coverage for the region;
identifying a solution category for the cluster based at least in part on the difference between predicted and measured coverage, wherein the solution category comprises one of an indoor category or an outdoor category; and
identifying a solution type, wherein the solution type corresponds to the solution category.

9. The method as recited in claim 1, wherein determining a solution type for the cluster comprises:
comparing the measured coverage data for the region to a threshold;
determining a site type for the cluster, the site type based at least in part on comparing the measured coverage data to the threshold, wherein the site type comprises at least one of a coverage type or a capacity type; and
identifying a solution type, wherein the solution type corresponds to the site type.

10. The method as recited in claim 1, wherein the solution type includes at least one of a small cell, a distributed antenna system, a cell split, a microcell, or a picocell.

11. A computer-implemented system comprising:
one or more data stores for storing:
computer-executable instructions,
geolocated traffic data corresponding to a geographic coverage area associated with a cellular network,
a respective predicted coverage forecast for each cell within a set of cells associated with the geographic coverage area, and
measured coverage data corresponding to the geographic coverage area;
a computing device in communication with the one or more data stores that, when executing the computer-executable instructions, is configured to:
identify a first cluster within the geolocated traffic data, the first cluster corresponding to a first region of high traffic density within the geographic coverage area;
identify a first subset of cells providing coverage within the first region, based at least in part on the predicted coverage forecast for each cell within the set of cells;
calculate a first aggregate score for the first cluster based at least in part on the predictive coverage forecast for each cell within the first subset of cells;
analyze the measured coverage data corresponding to the geographic coverage area to identify measured coverage data for the first region;
determine, based at least in part on the measured coverage data for the first region, a first solution type for the first cluster; and
output the first cluster, the first aggregate score, and the first solution type.

12. The computer-implemented system as recited in claim 11, wherein the computing device configured to output the first cluster is configured to transmit instructions that cause a client computing device to display a map of the first region.

13. The computer-implemented system as recited in claim 11, wherein the computing device is further configured to:
identify a second cluster within the geolocated traffic data, the second geographic cluster corresponding to a second region of high traffic density within the geographic service area;
identify a second subset of cells providing coverage within the second region, based at least in part on the predicted coverage forecast for each cell within the set of cells;
calculate a second aggregate score for the second cluster based at least in part on the predictive coverage forecast for each cell within the second subset of cells; and
determine that the first aggregate score is greater than the second aggregate score,
wherein output of the first geographic cluster, the first aggregate score, and the first solution type is responsive to the determination that the first aggregate score is greater than the second aggregate score.

14. The system as recited in claim 13, wherein the first region overlaps the second region.

15. The system as recited in claim 13, wherein the computing device is further configured to output the second cluster and the second aggregate score.

16. The system as recited in claim 13, wherein the computing device is further configured to:
analyze the measured coverage data for corresponding to the geographic coverage area to identify measured coverage data for the second region;
determine, based at least in part on the measured coverage data for the second region, a second solution type for the second cluster; and
output the second geographic cluster, the second aggregate score, and the second solution type.

17. The system as recited in claim 11, wherein the computing device is further configured to:
obtain business data corresponding to the first region, the business data identifying a number of business customers associated with the first region and, for each of the number of business customers, a respective type of business and a respective number of employees; and
calculate a business score for the first cluster, the business score based at least in part on the business data,
wherein the first aggregate score is further based at least in part on the business score.

18. The system as recited in claim 17, wherein the type of business includes at least one of a retail business, a small business, a real estate business, a finance business, or an insurance business.

19. The system as recited in claim 11, wherein the computing device is further configured to:

obtain crowdsourced data corresponding to the first region, the crowdsourced data identifying a number of users of mobile devices; and calculating a crowdsourced score for the first cluster, the crowd-sourced score based at least in part on the crowd-sourced data, wherein the first aggregate score is further based at least in part on the crowdsourced score.

20. The system as recited in claim 19, wherein the crowdsourced data comprises at least one of a number of customer care tickets opened by users of mobile devices, a number of deactivations by subscribers of the cellular network, a number of posts to social networking sites made by users of mobile devices, or a number of social networking check-ins to geographic points of interest.

21. A computer-implemented method comprising:

obtaining geolocated traffic data corresponding to a geographic coverage area associated with a cellular network;

identifying a cluster of the geolocated traffic data, the cluster corresponding to a region of high traffic density within the geographic coverage area;

identifying a subset of cells providing coverage within the region, wherein identifying the subset is based at least in part on measured coverage data corresponding to the geographic coverage area and a respective coverage forecast for each cell within a set of cells associated with the geographic coverage area;

determining a recommended solution type for the cluster based at least in part on the measured coverage data and the respective coverage forecasts;

generating a map of the region; and transmitting instructions to a client computing device to cause the client computing device to at least display the map of the region and the recommended solution type.

22. The computer-implemented method as recited in claim 21, wherein the map of the region includes at least one or more of the subset of cells, the respective coverage forecast for one or more cells within the subset of cells, or at least a subset of the geolocated traffic data.

23. The computer-implemented method as recited in claim 21 further comprising obtaining business data corresponding to the region, wherein the map of the region includes at least a subset of the business data.

24. The computer-implemented method as recited in claim 21 further comprising obtaining crowdsourced data corresponding to the region, wherein the map of the region includes at least a subset of the crowdsourced data.

* * * * *